United States Patent [19]

Koleske et al.

[11] 4,124,552

[45] Nov. 7, 1978

[54] WATER SOLUBLE, HIGH SOLIDS URETHANE COATING COMPOSITIONS

[75] Inventors: Joseph V. Koleske, Charleston; Oliver W. Smith, South Charleston, both of W. Va.

[73] Assignee: Union Carbide Corporation, New York, N.Y.

[21] Appl. No.: 690,277

[22] Filed: May 26, 1976

[51] Int. Cl.$^2$ .................. C08L 67/02; C08L 75/06; C08L 75/12

[52] U.S. Cl. .................. 260/29.2 TN; 260/29.2 N; 260/29.2 E; 528/71; 528/904

[58] Field of Search .................. 260/29.2 TN, 29.2 N, 260/29.2 E, 77.5 AN

[56] References Cited

U.S. PATENT DOCUMENTS

| | | | |
|---|---|---|---|
| 3,169,945 | 2/1965 | Hostettler et al. | 260/78.3 |
| 3,551,475 | 12/1970 | Brotherton et al. | 260/29.2 TN X |
| 3,553,249 | 1/1971 | Brotherton et al. | 260/29.2 TN X |
| 3,752,778 | 8/1973 | Dhein et al. | 260/29.2 TN |
| 3,759,873 | 9/1973 | Hudak | 260/29.2 TN X |
| 3,882,189 | 5/1976 | Hudak | 260/29.2 TN X |
| 3,897,381 | 7/1975 | Tugukuni et al. | 260/29.2 TN |

*Primary Examiner*—Thomas de Benedictis
*Attorney, Agent, or Firm*—Francis M. Fazio

[57] ABSTRACT

Water soluble, high solids urethane coating compositions comprising a polycaprolactone derivative, an aliphatic polyisocyanate and water. The polycaprolactone derivative is a water soluble, carboxyl modified oligomer addition reaction product mixture obtained by the reaction of polycaprolactone polyol and an anhydride of a polycarboxylic acid to produce a water insoluble adduct that on reaction with an inorganic or organic base produces the water soluble, carboxyl modified oligomer addition reaction product mixtures which are eminently suitable for the production of urethane coating compositions of this invention. The polycaprolactone polyol reacted with the polycarboxylic acid has an average at least two hydroxyl groups in the molecule, a hydroxyl number of from about 15 to about 600 and an average molecular weight of from about 290 to about 6,000. The carboxylic acid anhydride has at least one intramolecular carboxylic anhydride group.

12 Claims, No Drawings

WATER SOLUBLE, HIGH SOLIDS URETHANE COATING COMPOSITIONS

BACKGROUND OF THE INVENTION

Governmental regulations have placed ever increasing restrictions on the amounts and type of organic volatiles permitted to escape into the atmosphere from coatings compositions. Considerable efforts have been expended to develop coatings compositions having a minimal amount of volatile organic components and this has led to development of powder coatings, radiation curable coating and water borne coatings. In these recent developments the amounts of organic solvents present are minimal and consequently there is little or no atmospheric pollution.

A particularly well known resin used in the coatings industry is the class of urethane resins derived from epsilon-caprolactone and polyisocyanates. These polycaprolactone polyurethanes produce coating materials of exceptional and desirable properties. However, as in all major instances in the past, they have generally been applied from organic solvent solutions. Any discovery which would eliminate the organic solvent would be of great importance in the coatings industry which depends upon these materials in many manufacturing or coating operations. Consequently, any discovery, such as the one which is hereinafter described, which would serve to lower atmospheric pollution and still produce a good satisfactory coating composition would be of great importance.

SUMMARY OF THE INVENTION

It has now been found that certain water soluble polycaprolactone derivatives can be used in conjunction with certain aliphatic polyisocyanates for the production of water borne urethane coatings compositions. These water soluble polycaprolactone derivatives are obtained by reacting a polycaprolactone polyol and an anhydride of a polycarboxylic acid to produce a carboxyl modified adduct which is generally water insoluble that is then converted to the water soluble form by reaction with an inorganic or organic base. The water soluble, carboxyl modified oligomer addition reaction products resulting are then formulated with the aliphatic polyisocyanate and water into coatings compositions. The resulting aqueous formulations have an acceptable pot life for normal use. These aqueous coatings compositions are applied in conventional manner and thermally cured to dry film coatings.

DESCRIPTION OF THE INVENTION

A water soluble, or water based, high solids urethane coating composition is produced by mixing an aliphatic polyisocyanate with the water soluble, carboxyl modified oligomer addition reaction product mixtures hereinafter described in an aqueous base. There is obtained a clear to milky water-based urethane coating composition. These coating compositions can also contain the other additives conventionally present in a coating composition, such as, dyes, fillers, pigments, fungicides, bacteriacides, etc., in the usual quantities employed, as known to those skilled in the art.

The water soluble, carboxyl modified oligomer addition reaction product mixtures or adducts are derivatives of polycaprolactone polyols and intramolecular anhydrides of polycarboxylic acids that have been converted to a water soluble form by reaction with a base. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols used in producing the adducts can be single compounds or mixtures of compounds and either can be used in this invention. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly-(oxyethylene-oxypropylene) glycols, and similar polyalkylene glycols, either blocked, capped or heteric, containing up to about 40 or more alkyleneoxy units in the molecule, 3 methyl-1,5-pentanediol, cyclohexanediol, 4,4'methylene-bis-cyclohexanol, 4,4'-isopropylidene bis-cyclohexanol, xylenediol, 2-(4 hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis-(2-hydroxyethyl)ethylene diamine, and the like.

When the organic functional initiator is reacted with the caprolactone a reaction occurs that can be represented in its simplest form by the equation:

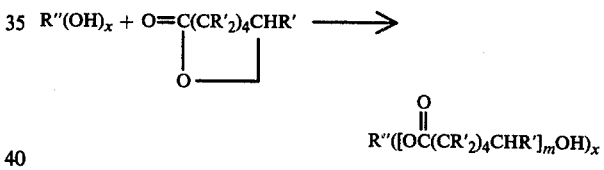

In this equation the organic functional initiator is the $R''—(OH)_x$ compound and the caprolactone is the $$O=C(CR'_2)_4CHR'$$

compound; this can be caprolactone itself or a substituted caprolacetone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The preferred are the polycaprolactone diol compounds having an average molecular weight of from about 290 to about 500 and the polycaprolactone triol compounds having an average molecular weight of from about 300 to about 1,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone polyol has an average of from 2 to 6, preferably 2 to 4, hydroxyl groups.

Illustrative of polycaprolactone polyols that can be used as starting materials in this invention one can mention the reaction products of a polyhydroxyl compound having an average of from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

POLYCAPROLACTONE POLYOLS

| | Initiator | Average MW of polyol | Average No. of CPL units in molecules |
|---|---|---|---|
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*Average molecular weight of glycol.

The structure of the compounds in the above tabulation are obvious to one skilled in the art based on the information given. The structure of compound No. 7 is:

wherein the variable $r$ is an integer and the sum of $r + r$ has an average value of 3.7 and the average molecular weight is 527. The structure of compound No. 20 is:

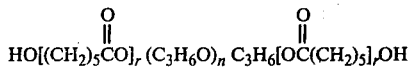

wherein the sum of $r + r$ has an average value of 6 and the average molecular weight is 1,684. This explanation makes explicit the structural formulas of compounds 1 to 34 set forth above.

The polycaprolactone polyol is reacted with a polycarboxylic acid anhydride and illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interefere with the reaction.

The amount of polycarboxylic acid anhydride reacted with the polycaprolactone polyol can be an amount sufficient to permit reaction with all of the hydroxyl groups; however, it is preferred to use an amount which is insufficient to react with all of the hydroxyl groups present in the polycaprolactone polyol. This amount will vary and can be from 0.1 to 1 anhydride equivalent for each hydroxyl equivalent or groups present in the polycaprolactone polyol initially charged to the reaction mixture, and is preferably from 0.1 to 0.4. In a most preferred instance, one anhydride equivalent or anhydride moiety is charged for each nine hydroxyl equivalents or groups initially present in the reaction mixture.

The polycaprolactone polyols are reacted with the polycarboxylic acid anhydride at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified oligomer addition reaction product obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomer or adducts are water insoluble but solvent soluble.

The water insoluble adducts described above are converted to water soluble form by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N,N-diethyl ethanolamine, N,N-dimethyl propanolamine, triethanolamine, diethylamine, triisopropanolamine, monoethanolamine, diethanolamine, mono-isopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably from 7 to 9.

Reaction with the amine produces a product or adduct which is predominantly water soluble. This water soluble adduct is eminently suitable for the production of the water borne urethane coating compositions of this invention. While applicants have not fully established the structures of the adducts present in this water soluble, carboxyl modified oligomer addition reaction product mixture, it has been theorized that the reaction can proceed along the following route; it being recognized that the reaction product is a complex mixture of components.

STEP 1

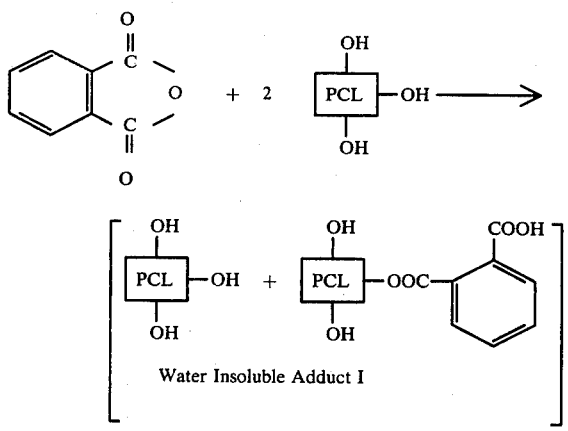

Water Insoluble Adduct I

STEP 2

Water Insoluble Adduct I + $CH_3N(CH_2CH_2OH)_2$
→

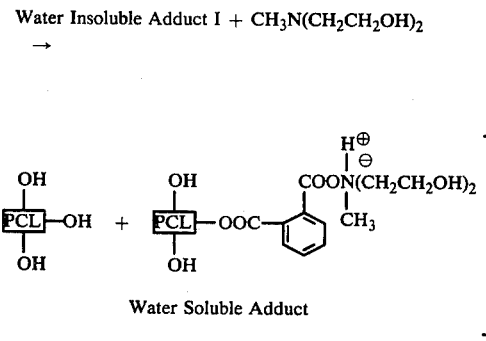

Water Soluble Adduct

In the above, the unit

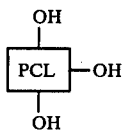

represents a polycaprolactone triol. In some instances, depending upon the amount of anhydride used in Step 1, the amount of water used to dissolve the adduct of Step 2 may be restricted before evidence of insolubilization is noted. While this theoretical explanation is presented, applicants do not intend to be bound by any theory.

In a typical reaction one normally charges a polycaprolactone polyol and the polycarboxylic acid anhydride to a reaction vessel and heats the mixture to a temperature of from about 125° to 175° C. for a period of about 20 to 30 minutes. This produces a water insoluble carboxyl modified oligomer or adduct. This water insoluble adduct is then neutralized with the base or amine at any convenient temperature and there is obtained a water soluble, carboxyl modified oligomer addition reaction product mixture or adduct as previously described that is admixed with the aliphatic polyisocyanate.

In the schematics shown above specific ratios and compounds were employed for illustrative purposes only. It is apparent, in view of our complete description, that these can be modified within the ranges disclosed in this application.

In producing the water soluble, high solids urethane coating compositions of this invention, the second essential component therein is an aliphatic polyisocyanate having from 2 to 6, preferably from 2 to 4, isocyanato groups in the molecule. The aliphatic portion of this polyisocyanate can be a polyvalent linear or branched alkyl group having from about 4 to about 20 carbon atoms, preferably from about 6 to 10 carbon atoms; or a cycloaliphatic group having 6 carbon atoms in the cycloaliphatic ring thereof. Illustrative of suitable aliphatic polyisocyanates one can mention tetramethylene diisocyanate, octadecylene diisocyanate, 3,5,5-trimethyl-1-isocyanato-3-isocyanatomethylcyclohexane, di(2-isocyanatoethyl) bicyclo[2.2.1]hept-5-ene-2,3-dicarboxylate, hexamethylene diisocyanate, dicyclohexyl-4,4'-methane diisocyanate, cyclohexane diisocyanate, 2,4,6-cyclohexane triisocyanate, 4,4'-methylene bis(cyclohexylisocyanate), and the like.

The amount of isocyanate used in producing the coating composition is an amount to provide from about 0.5 to about 1 isocyanato equivalent per hydroxyl equivalent present in the coating composition.

The coating composition can also contain water as a diluent. The amount thereof can vary up to about 25 weight percent or more, preferably from about 10 to 20 weight percent, of the combined weight of the water soluble, carboxyl modified oligomer addition reaction product mixture or adduct plus the aliphatic polyisocyanate plus the water. As previously indicated, the amount of water that can be used to obtain complete solution of the adduct varies and is dependent to some extent upon the ratio of reactants used in its preparation. Thus, the amount necessary for a complete solution can readily be adjusted by one skilled in the art.

In producing the water soluble, high solids urethane coating compositions of this invention, the selected components previously defined are mixed with each other to form a uniform homogeneous mixture or solution. Any of the conventional mixing means can be used. In view of the reactive nature of the mixture, the reactants are mixed with each other within a short period prior to the intended use of the coating composition. The mixed coating composition has a sufficiently adequate pot life that it can then be applied to the substrate and cured. Also, as previously indicated, the coating composition can be modified in known manner by the addition of pigments, fillers and other additives conventionally added to coating or ink compositions.

The coating compositions are applied to a substrate by the known conventional methods. They are cured by heating at a temperature of about 100° to 250° C., preferably from 150° to 200° C. for a period of time sufficient to obtain a dry film. Generally, this time will range from about one to 30 minutes, preferably from 10 to 20 minutes. The components present in a particular coating composition used will determine the temperature and time that will be required to obtain an adequate cure and a good film coating.

The urethane coatings compositions of this invention are generally high solids coatings compositions and they can contain as much as about 90 weight percent solids therein. Generally the total solids content of the urethane coatings compositions of this invention range from about 60 to 90 weight percent, preferably 80 to 90 percent, of the total weight of the composition.

Solvent resistance is a measure of the resistance of the cured film to attack by acetone and is reported in the number of double rubs or cycles of actone soaked material required to remove one half of a film from the test area. The test is performed by stroking the film with an acetone soaked cheesecloth until the amount of film coating is removed and the number of cycles required to remove this amount of coating is reported as a measure of the coating solvent resistance. The evaluation is stopped after 100 rubs since a sample reaching this value is considered acceptable.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is recorded as the films reverse-impact resistance.

In this application the following definitions describe the particular compounds that are used in the example: Silicone Surfactant I is

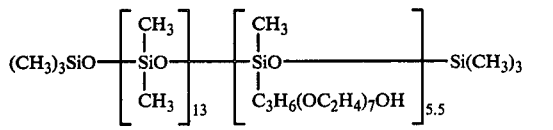

Polyol A is a polycaprolacetone triol having an average molecular weight of 540 and an average hydroxyl number of 310 (mgm. KOH per gram).
Polyol B is a polycaprolactone triol having an average molecular weight of 300 and an average hydroxyl number of 560.

The following examples further serve to define this invention.

EXAMPLE 1

A reaction flask equipped with a stirrer, thermometer and nitrogen inlet tube was charged with 1,080 grams of Polyol A, 1,080 grams of Polyol B and 240 grams of phthalic anhydride. The mixture was heated for 30 minutes at 130° C. and a lightly colored, water insoluble adduct was produced. To this adduct there were added 150 grams of N,N-dimethyl ethanolamine and there was obtained the desired water soluble, carboxyl modified oligomer addition reaction product mixture.

A urethane coating composition was produced by formulation of 10 grams of the above water soluble, carboxyl modified oligomer addition reaction product mixture with 5 grams of 4,4'-methylene bis(cyclohexyl isocyanate), 10 grams of distilled water and 2 drops of Silicone Surfactant I. Films were cast with this water based, high solids urethane coating composition on two steel panels using a No. 40 wire wound rod. The first panel was cured in an oven at 350° F. for 20 minutes to yield a hard, flexible film that had a solvent resistance rating of 100; it showed a spider-web design. The second sample was allowed to stand at room temperature; after several hours it was still tacky and filled with small bubbles. The results show that water soluble, high solids coating compositions containing the water soluble, carboxyl modified oligomer addition reaction product mixture and an aliphatic polyisocyanate having an acceptable pot life can be produced, applied and cured to dry film coatings.

EXAMPLE 2

Following the procedure described in Example 1, a mixture of 175 grams of Polyol A, 175 grams of Polyol B and 50 grams of phthalic anhydride was reacted to produce the water insoluble adduct. To a 100 grams portion there were added 8.5 grams of triethylamine and the water soluble, carboxyl modified oligomer addition reaction product mixture was obtained.

A series of water soluble, high solids urethane coating compositions was prepared using the above oligomer in the formulations indicated below. In each instance the 4,4'-methylene bis(cyclohexyl isocyanate), identified as MBCI in the table, was the last component added. The milky solutions were coated on steel panels with a No. 60 wire wound rod and cured at 300° F. for 10 minutes. During coating bubbles were noted that disappeared during the cure. In Runs B and C the coating cured to a dry film and surface wrinkling developed. The surface of Run A remained tacky, due to the low NCO/OH ratio and short cure time; longer cure time or higher NCO/OH ratio results in a dry film.

| Run | A | B | C |
|---|---|---|---|
| Oligomer, g | 10 | 10 | 10 |
| MBCI, g | 5 | 7.5 | 10 |
| Water, g | 10 | 10 | 10 |
| Silicone Surfactant I, g | 0.1 | 0.1 | 0.1 |
| NCO/OH Ratio | 0.5 | 0.7 | 1 |
| Pencil Hardness | — | 2 H | 3 H |
| Reverse Impact, in-lb | — | >320 | >5 |

EXAMPLE 3

The influence of water concentration in the urethane coating compositions of this invention was investigated in the following series of formulations. The oligomer used was that prepared in Example 2. The coatings of Runs A and B were cured at 300° F. for 10 minutes. The coating of Run C was cured at 275° F. for 10 minutes and showed the best overall film properties. With this particular oligomer, the formulation of Run A showed significant incompatibility due to the low water concentration used.

| Run | A | B | C |
|---|---|---|---|
| Oligomer, g | 10 | 10 | 10 |
| MBCI, g | 7.5 | 7.5 | 7.5 |
| Water, g | 1 | 2 | 3 |
| Silicone Surfactant I | 0.1 | 0.1 | 0.1 |
| % Water | 5.4 | 10.3 | 14.6 |
| Film Appearance | | | |

Run A - incompatible, film separation
Run B - slight evidence of incompatibility, edge of film tacky
Run C - compatible, smooth dry film For comparative purposes an attempt was made to prepare a similar formulation with this oligomer but using an aromatic diisocyante, tolylene diisocyanate. The mixture exothermed and foamed immediately since the aromatic diisocyanate was too reactive to be of value. This illustrates the necessity for the use of aliphatic polyisocyanates in our urethane compositions.

EXAMPLE 4

A water soluble, high solids urethane coating composition was prepared by uniformly mixing 12.5 grams of the water soluble oligomer prepared in Example 2, 13.9 grams of the triisocyanate obtained by reacting hexamethylene diisocyanate with water, 5 grams of water and 0.1 gram of Silicone Surfactant I. The composition was cast on to a steel panel with a No. 60 wire wound rod and cured at 300° F. for 10 minutes. The dry, cured film was reasonably smooth and had excellent flexibility, adhesion, solvent resistance and hardness properties.

EXAMPLE 5

A water soluble, high solids urethane coating composition was produced by initially mixing 200 grams of the water soluble oligomer prepared in Example 1, 200 grams of titanium dioxide, 80 grams of distilled water, 0.4 gram of the nonylphenyl polyethylene glycol ether and 0.7 gram of Silicone Surfactant I in a ball mill and rolling overnight. To this pigment grind there were added 7 grams of 4,4'-methylene bis(cyclohexyl isocyanate) and 2 grams of water and the pigmented urethane coating composition was coated on to a steel panel and cured at 300° F. for 10 minutes. A dry, hard film was produced.

For comparative purposes formulations were prepared using Polyol B, 4,4'-methylene bis(cyclohexyl isocyanate) and water. They were coated on to steel panels and heated for 10 minutes at 300° F. The formulation of Run X was incompatible and would not form suitable films; Runs Y and Z yielded films that were tacky around the edges. All the films had poor flexibility and were cheesey.

What we claim is:

1. A water based high solids urethane coating composition comprising:
    (a) an aliphatic polyisocyanate,
    (b) a water soluble, carboxyl modified oligomer addition reaction product mixture of the reaction of a polycaprolactone polyol and an intramolecular anhydride of a polycarboxylic acid, wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group and an inorganic or organic base in an amount sufficient to neutralize the free carboxyl groups of said-addition reaction product mixture, and
    (c) water.

2. A water based high solids urethane coating composition as claimed in claim 1, wherein in said component (b) said polycaprolactone polyol has from 2 to 6 hydroxyl groups and said base is an organic amine.

3. A water based high solids urethane coating composition as claimed in claim 1, wherein in said component (b) said polycaprolactone polyol has from 2 to 4 hydroxyl groups and said base is an organic amine.

4. A water based high solids urethane coating composition as claimed in claim 1, wherein in said component (b) said polycaprolactone polyol has a molecular weight of from 290 to 3,000 and said base is an organic amine.

5. A water based high solids urethane coating composition as claimed in claim 1, wherein in said component (b) said polycaprolactone polyol is a triol having an average molecular weight of from 290 to about 500 and said base is an organic amine.

6. A water based high solids urethane coating composition as claimed in claim 1, wherein in said component (b) said polycaprolactone polyol is a mixture of polycaprolactone polyols and said base is an organic amine.

7. A water based high solids urethane coating composition as claimed in claim 1, wherein in said component (b) said anhydride is phthalic anhydride and said base is an organic amine.

8. A water based high solids urethane coating composition as claimed in claim 1, wherein in said component (b) said base is triethylamine.

9. A water based high solids urethane coating composition as claimed in claim 1, wherein in said component (b) said base is N,N-dimethyl ethanolamine.

10. A water based high solids urethane coating composition as claimed in claim 1 wherein said component (a) is 4,4'-methylene bis(cyclohexyl isocyanate).

11. A water based high solids urethane coating composition as claimed in claim 1 wherein said component (a) is the triisocyanate produced from hexamethylene diisocyanate and water.

12. A water based high solids urethane coating composition as claimed in claim 1 wherein said component (a) is 4,4'-methylene bis(cyclohexyl isocyanate), said component (b) is the adduct of a mixture of a polycaprolactone triol having an average molecular weight of 540 and a polycaprolactone triol having an average molecular weight of 300 and phthalic anhydride neutralized with N,N-dimethyl ethanolamine.

* * * * *